A. F. PRESTON, DEC'D.
J. ABBOTT AND A. B. WHITE, ADMINISTRATORS.
PATTERN CUTTING MACHINE.
APPLICATION FILED MAY 18, 1916. RENEWED OCT. 6, 1920.
1,383,023.
Patented June 28, 1921.
2 SHEETS—SHEET 1.
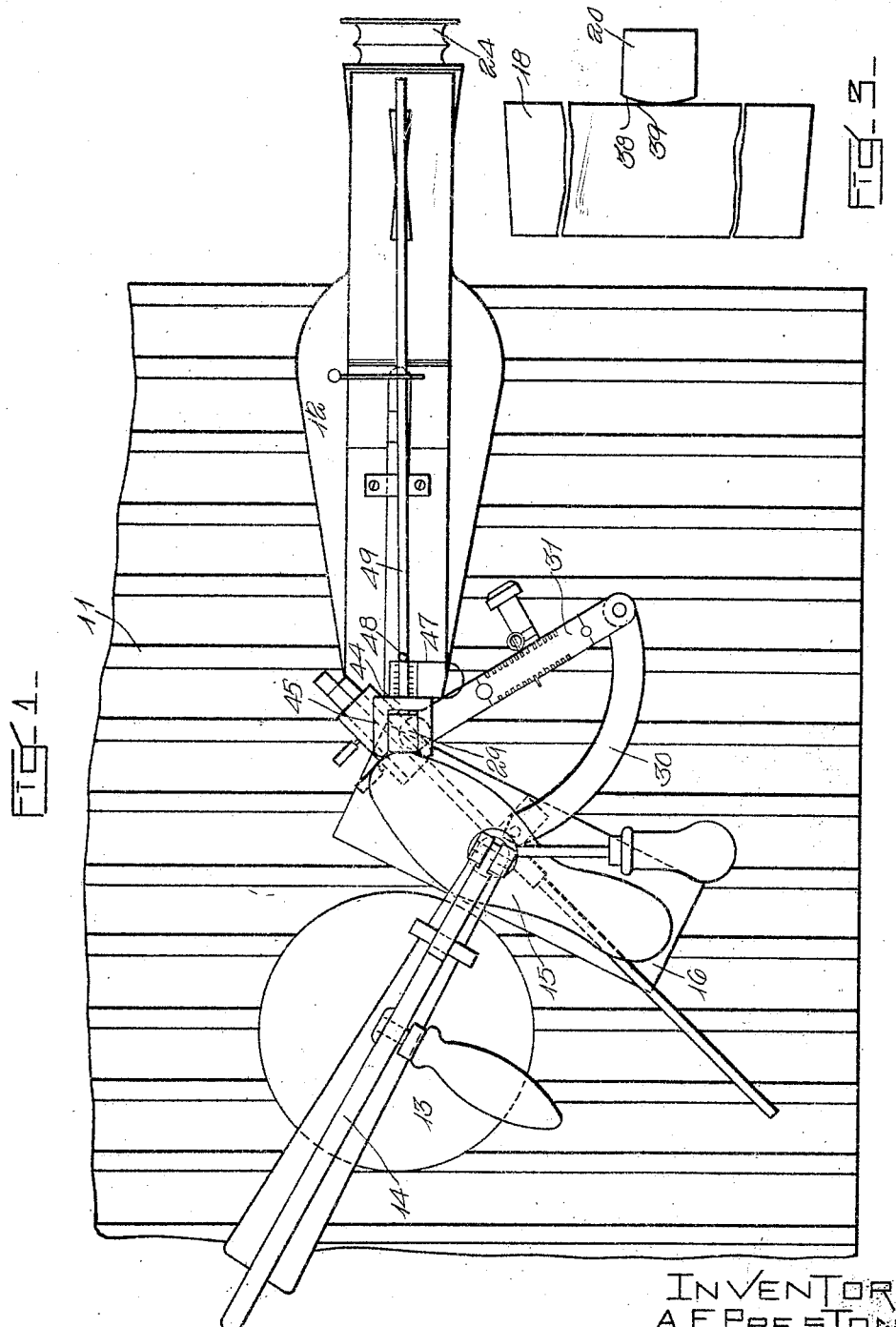
INVENTOR=
A.F. PRESTON
By Wright, Brown, Quimby & Seay
ATTORNEYS

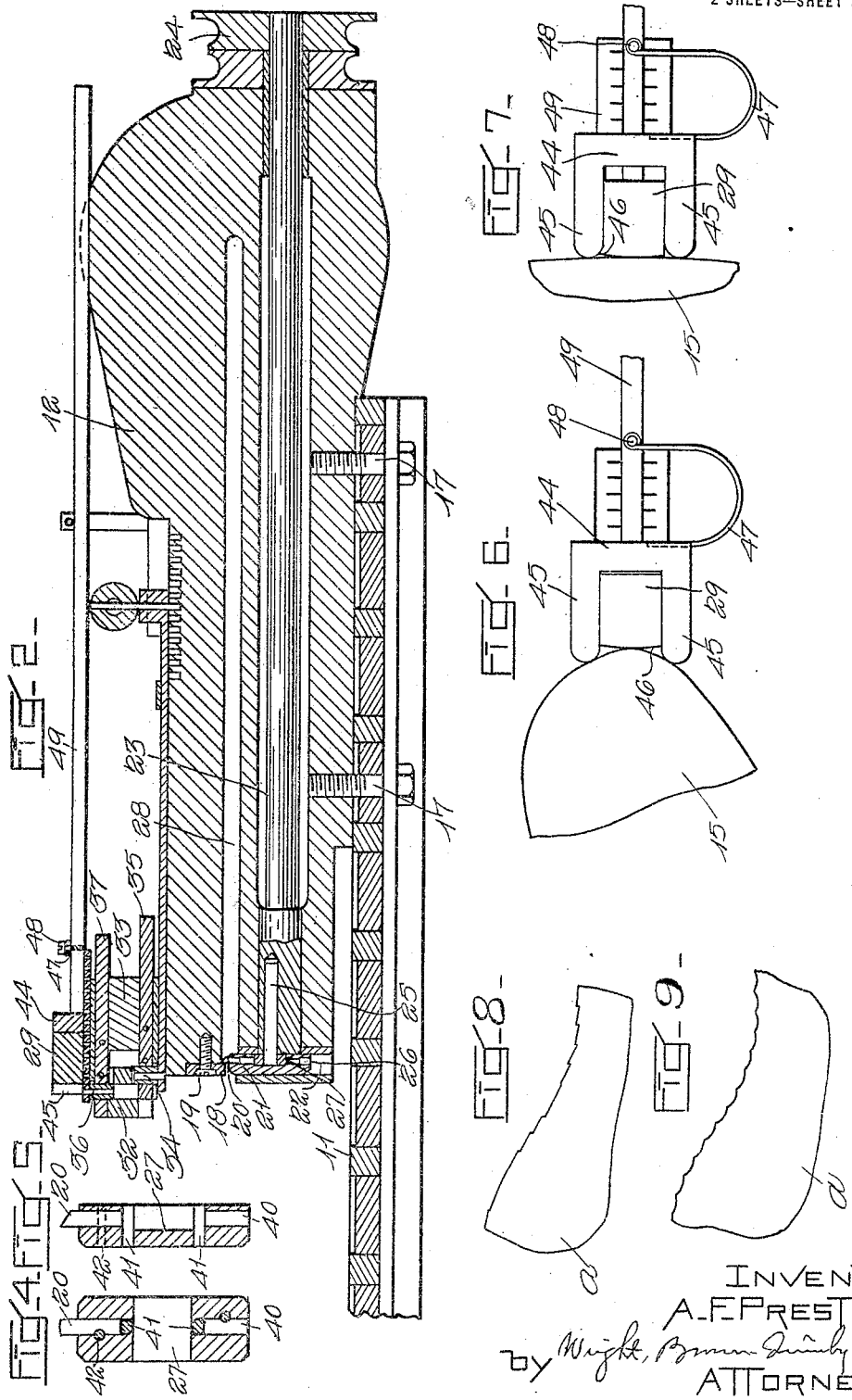

UNITED STATES PATENT OFFICE.

ALBERT F. PRESTON, OF BOSTON, MASSACHUSETTS; JOHN ABBOTT, OF WINCHESTER, MASSACHUSETTS, AND ALFRED BENSON WHITE, OF BROOKLINE, MASSACHUSETTS, ADMINISTRATORS OF SAID ALBERT F. PRESTON, DECEASED, ASSIGNORS TO JOHN ABBOTT, OF WINCHESTER, MASSACHUSETTS, AND ALFRED B. WHITE, OF BROOKLINE, MASSACHUSETTS.

PATTERN-CUTTING MACHINE.

1,383,023.   Specification of Letters Patent.   Patented June 28, 1921.

Application filed May 18, 1916, Serial No. 98,342. Renewed October 6, 1920. Serial No. 415,217.

*To all whom it may concern:*

Be it known that I, ALBERT F. PRESTON, a citizen of the United States, residing at Boston, in the county of Suffolk and State of Massachusetts, have invented new and useful Improvements in Pattern-Cutting Machines, of which the following is a specification.

The present invention relates to machines for cutting patterns out of sheet stock either like a model in some or all particulars, or similar wholly or in part to such model and graded up or down, that is larger or smaller than the model. The particular objects of the present invention are concerned with the cutting means by which the sheet material is severed, and the guiding means for the standard pattern or model, for purposes which are fully explained in the following detailed description of the invention. Stated in general terms my object is to produce a power operated grading and cutting machine having greater accuracy and capable of turning out better finished work than previous machines of that nature. One feature of the invention also resides in an improved cutting or shearing mechanism having novel features and principles as hereinafter set forth.

I have embodied the improvements which constitute the present invention in a power operated pattern cutting and grading machine of the type shown in my prior Patents No. 951,886 dated March 15, 1910, and No. 1,105,534 dated July 28, 1914, to which reference is directed for description of such details of the machine as are omitted from this specification. In the present specification I have shown and described only enough of the machine to explain the arrangement and mode of use of the appliances in which the present invention is particularly embodied, and have chosen for such illustration the specific machine shown in the aforesaid Patent No. 1,105,534.

In the drawings,

Figure 1 is a plan view of the machine referred to in its entirety.

Fig. 2 is a longitudinal section of the cutter head of the machine on a somewhat larger scale than that of Fig. 1.

Fig. 3 is a plan view much enlarged of the complemental cutters which constitute the cutting or shearing device with which one feature of my present invention is particularly concerned.

Figs. 4 and 5 are detail sectional views of the cutter holder and cutter illustrating an improved mode of mounting the cutter in the holder.

Figs. 6 and 7 are plan views enlarged of the improved guide which forms another feature of the invention, said figures respectively showing the parts of said guide in different positions.

Figs. 8 and 9 are diagrams showing fragments of a pattern such as the machine is adapted to produce, and illustrating by contrast the new and improved result accomplished by the present improved cutting device.

The same reference characters indicate the same parts in all the figures.

The machine comprises a table or bed 11 to which is secured a cutting head 12 and on which rests the base or pedestal 13 of a jack 14 which carries the standard pattern or model 15 and a sheet of stock 16, and is adapted to be moved freely in all directions over the bed. The pattern which is to be a duplicate in whole or in part of the model 15 or a graded enlarged or reduced reproduction wholly or in part of the same is cut from the stock 16. For the purpose of brevity of description I will hereinafter refer to the pattern which is cut from the sheet 16 as the reproduced pattern, the pattern 15 being the model. The model and stock are clamped in the jack 14 one above the other with a space between, and in a manner permitting them to be rotated in unison with respect to the jack, as fully shown and described in my Patent No. 1,105,534.

The cutter head 12 is secured to the bed by bolts 17 as shown in Fig. 2, and is provided with complemental cutters, one of which is a disk 18 secured by a screw 19 to the head fixedly, but with capability for being turned to present a fresh sharp portion of the edge to the complemental cutter when another portion of such edge becomes blunt. The complemental cutter 20 is mounted in a carrier or block 21 which slides in a guideway 22 on the head, so arranged that the end of the cutter 20, on which is the cutting edge, passes back and forth across the nearest part of the edge of the cutter 18, said cutters 18 and 20 thus constituting a pair of shears. As the cutter 18 is relatively stationary it may well be considered an abutment which sustains the stock against the thrust of the complemental cutter 20 and against which the stock is pressed by the cutting edge of the latter, said cutting edge traveling in a path beside and close to the abutment across the stock-sustaining surface thereof. The cutter 20 is reciprocated rapidly by shaft 23, power driven by a pulley 24 around which a driving belt passes, said shaft having a crank pin 25 carrying an antifriction roll 26 which travels in a transverse groove 27 in the carrier or block 21.

The sheet of stock 16 is held by the jack at a height which enables it to be passed between the cutters 18 and 20 to a greater or less extent into the slot 28 formed in the head between the parts thereof on which the two cutters are respectively mounted. The model 15 is held by the jack at the height of a guide 29 which is connected with the cutter head and with the jack by a pantograph mechanism which includes arms 30, 31 and slides 32, 33, one of which slides is connected to the cutter head by a pivot pin 34 and a bar 35, and to the other of which the guide is connected by a pivot 36 and a bar 37, all as fully described in my Patent No. 1,105,534. As the present invention involves no change in the pantograph mechanism the description of the same is not repeated herein. It is sufficient for present purposes to note that the guide 29 is arranged to be engaged by the model so as to guide the jack in presenting the sheet of stock to the cutting device in such a way that the reproduced pattern will be correctly graded with respect to the model.

One of the features of my invention involves improvements in the cutting mechanism consisting principally in the fact that the cutting edge 38 of the cutter 20 is curved, and also in the combination of such curved cutting edge with the straight edge of the complemental cutter or abutment 18. In describing the edge of the cutter 18 as straight I have reference to the projection of such edge upon a horizontal plane, and disregard the circular periphery of the disk, which lies in a vertical plane and has no influence whatever on the result accomplished by the cutting device. The essential thing is that the projection of the operative part of the cutting edge of disk 18 on a horizontal plane, that is, a plane parallel to the sheet of stock and parallel or coincident with the line of movement of the cutter 20 is a straight line 39, and is essentially the same as though the cutter were a bar having a literally straight edge, or a polygon having a periphery made up of short straight lines or planes. The projection of the edge 38 of the cutter 20 on the plane of the stock to be cut is curved, and is tangent preferably at its middle point, to the projection in the same plane of the edge of the cutter 18. The cutter 20 is a bar which is curved or rounded, preferably as the segment of a cylinder, on the side next to the plane in which the cutting edge 39 of the cutter 18 lies. The end of the cutter 20 is ground off on a bevel at an acute angle to the rounded side. Incidentally the cutting edge, formed by the intersection of an inclined plane with a curved surface, is highest at the middle part, but except for the fact that this formation makes it somewhat easier for the cutter to penetrate the stock, it is of no consequence to the real invention. The utility of the invention is graphically shown in Figs. 8 and 9 which show respectively, in a somewhat exaggerated way, the character of work performed respectively by the cutters previously used and by my improved cutter. In both figures, a represents a fragment of a reproduced pattern.

The reciprocating cutter used in my prior machines had a straight edge, which made it incapable of cutting curved outlines with absolute accuracy because necessarily the outlines thereby cut would consist of straight segments and could not conform exactly to curved parts of the pattern. In reproducing convex outlines the departure from the exact curvature is unimportant, but in concave parts of the pattern the departure is more serious because the corners of the cutter must unavoidably cut more deeply into the reproduced pattern than the required outline. That this must be so is evident from the fact that if the straight edge of the cutter is tangent to the curve at a concaved or recessed part of the pattern at any point, one or both corners must extend into the stock within the required curve of its edge. A further difficulty has been encountered in that it is difficult to feed the pattern and stock always with respect to the cutter head so that the line on which the reproduced pattern is to be cut is always exactly tangent to the edge of the cutter, and generally, particularly when cutting out sharply concave parts of the cutter, this line would be considerably inclined to the cutting edge at the cutting point. The result generally has been to produce an edge in the reproduced pattern having notches as shown, in a somewhat exaggerated way, in Fig. 8. This effect is particularly pronounced in hard stock such as sheet iron and the like, and in such stock it is particularly objectionable. If the projections are removed by filing or otherwise enough to make the notched edge smooth, the accuracy of the outline is destroyed to a greater or less extent, because carried back to the bottoms of the notches, which lie within the correct bounding outline of the pattern.

With the improved form of cutting or shearing device no such error can occur, even when the line on which the pattern is cut is held at a considerable angle to the line tangent to the central point of the cutting edge. No matter how much the pattern is inclined out of the correct position, within limits, the cut made by the cutter is accurately placed and is always tangent to the correct bounding line of the pattern. The pattern thereby cut is outlined as shown in Fig. 9 by a series of scallops, all of which are tangent to the correct bounding line. The height of the ridges between the scallops is determined by the rate of feed of the stock past the cutting device and may, by making the feed very slow, be reduced to an inconsiderable trifle. In any event these projections or ridges can be removed by buffing, and when thus removed the smooth edge resulting conforms exactly to the correct finished outline required in the reproduced pattern.

The cutting element or knife 20 is removable from the carrier 21 for sharpening and renewal, being contained in a socket open at one end of the block. There are two such sockets arranged at respectively opposite ends of the block and opening into the transverse slot 27 thereof. The inner end of the blade rests on a stop 41, and is retained in place by a pin 42 which passes through the block and projects into a notch 43 in the side of the knife. The pin 42 and stop 41 may both be removed when it becomes necessary to take out the knife, the knife being dislodged by an instrument inserted through the alined socket 40 in the opposite end of the block and pressed against the butt or foot of the knife.

Another improvement is concerned with the guide. Heretofore the guides used in machines of this sort have been practically nothing more than pins having slight width in the direction of feeding of the pattern model and convex on the side toward the model. Difficulty has been experienced in holding the model properly against the guide, particularly when steeply curved or pointed parts of the model are brought past it. There is great liability of the pointed part of the pattern slipping off the guide, in consequence of which the jack and the pattern stock are moved in a direction not intended with respect to the cutting mechanism. It should be borne in mind that the jack is shifted by hand and that an appreciable muscular effort is required thus to move it. At the same time the pattern must be turned and placed so that its edge will be as nearly as possible square with the edge of the cutter; that is, in such relation that the outline of the reproduced pattern will be tangent to the middle point in the cutting edge of the cutter. It is difficult for the operator to manipulate the pattern and at the same time apply just the right amount of strength in shifting the jack to round the corner of a pointed pattern without allowing the corner to slip off to one side of the guide and causing the pattern stock to be moved past the cutter in a direction making a large angle with the cutting edge. Such an accident has been of rather frequent occurrence and increases the objectionable effect above noted of the corner of the cutter, particularly of a straight edged cutter, nicking the work piece within the line of the correct graded edge. The improvement which is here shown makes accidents of this character impossible. It consists in the combination with a guide plate or block 29 of a slide 44 having arms 45 which embrace the guide block and project beyond the face 46 thereof which is engaged with the model. The frame 44 slides with respect to the guide and is normally held by a spring 47 so that its cross beam is against the back edge of the guide. Said spring reacts against a stud 48 carried by the bar 49 on which the guide is secured and by which it is positioned with respect to the pantographic mechanism. The work engaging face of the guide is convex. The projecting arms 45, however, provide two points of contact with the model pattern, one on each side of the guide, for pointed or sharply curved parts of the pattern and resist displacement thereof from the guide, as shown clearly by Fig. 6. When straight or concaved parts of the model are brought up to the guide the arms 45 are pushed back against the spring to such extent as is necessary to permit the model to reach the guide. The arms 45 are rounded to permit the model slipping smoothly past them.

The improvement in the guide which makes impossible the slipping off of a pointed pattern, coacts with the cutter having the curved edge in preventing the possibility of nicking the reproduced pattern inside of the required edge outline, and insures the edge being square with the knife.

What I claim and desire to secure by Letters Patent is:

1. A pattern grading and cutting machine comprising the combination with a holder for a model pattern and for a sheet of stock, a guide adapted to coact with such model, elements associated with the guide and projecting at each side of the engaging element thereof for resisting escape of the model therefrom, and a cutting apparatus for outlining a reproduced pattern in such sheet; said holder on the one hand, and said guide and cutting apparatus on the other hand, being mounted for relative movement whereby to effect relative traverse between the model and guide, and corresponding shifting of the point of action of the cutting apparatus on the sheet of stock.

2. In a pattern grading and cutting machine the combination with a holder having means for supporting a model pattern and a sheet of stock in superposed relation and separated from one another, of a cutting apparatus for cutting out a reproduced pattern of said stock and a guide for guiding the stock with reference to said cutting mechanism by engagement with the model pattern, said holder on the one hand and said guide and cutting apparatus on the other hand being relatively displaceable in directions parallel to the plane of the model, and the guide having means for preventing slipping of the model therefrom when the model is so placed that an adjacent portion of its edge is much inclined to a line tangent to the said cutting edge.

3. A pattern grading and cutting machine comprising a shearing mechanism one member of which has an edge the projection of which in the plane of the material to be cut is in a straight line, and the other having an edge of which the projection in the same plane is a curved line tangent to the aforesaid straight line, a guide for a model pattern having a contact point or element in a determined relation to said shearing mechanism, and holding means for a piece of such material and for said model pattern, said holding means on the one hand, and the shearing mechanism and guide on the other hand being relatively displaceable in directions parallel to said plane.

4. A pattern grading and cutting machine comprising a holder for a model and pattern stock, cutting means, and a guide, said holder being movable to carry the model in contact with the guide past the latter and to carry the stock past the cutting means, and movable projections on each side of said guide yieldingly urged so as to project beyond that portion of the guide which is engaged with the model, making contact with the latter at points each side of its point of engagement with the guide, whereby to impede movement of pointed or sharply curved parts of the model laterally past the guide.

5. A pattern grading and cutting machine comprising a holder for a model and pattern stock, cutting means, and a guide, said holder being movable to carry the model in contact with the guide past the latter and to carry the stock past the cutting means, and movable projections on each side of said guide yieldingly urged so as to project beyond that portion of the guide which is engaged with the model and make contact with the latter at points each side of its point of engagement with the guide, whereby to impede movement of pointed or sharply curved parts of the model laterally past the guide, said projections being retractable against yielding resistance back of that portion of the guide which so engages the model.

6. A machine for outlining patterns like or similar to an irregular model comprising a holder for a model and pattern stock, a guide against which said model is adapted to bear, the holder being movable to carry the edges of said model past the guide and similarly to move the stock, and coöperating cutters arranged to act against opposite surfaces of the stock, one of said cutters having an edge of which the projection on the plane of the stock is a straight line, and the other having an edge of which the projection in the same plane is a curved line adjacent to said straight line, and means for reciprocating one of said cutters across the edge of the other.

7. A machine for grading and cutting patterns having curved edges of varying radius and direction of curvature comprising a holder for a model pattern and pattern stock which is movable translatively and rotatably, a guide against which the edges of the model are held successively and past which the same are moved by travel of the holder, complemental shearing cutters adapted to act against respectively opposite sides of the stock to cut out a reproduced pattern therefrom, one of said cutters having an edge of which the opposite end parts are deflected away from the co-acting part of the other cutter, whereby to avoid cutting the stock within the designed outline of the reproduced pattern, and means for moving one of said cutters so as to carry its edge back and forth across the adjacent edge of the other cutter.

8. In a cutting machine the combination of a cutter holder having a socket, a cutting element or knife contained within said socket, a detachable abutment arranged across said socket to receive the thrust of the inner end of said knife, and a retaining pin passing through said block partly intersecting the socket and entering a notch in the knife.

In testimony whereof I have affixed my signature.

ALBERT F. PRESTON.